UNITED STATES PATENT OFFICE.

GUSTAV HESS, OF PIRNA, GERMANY.

MAKING ALBUMINOUS BREAD.

No. 911,722.

Specification of Letters Patent.

Patented Feb. 9, 1909.

Application filed October 31, 1905. Serial No. 285,362.

*To all whom it may concern:*

Be it known that I, GUSTAV HESS, a subject of the German Emperor, and residing at Pirna, Germany, have invented certain new and useful Improvements in Making Albuminous Bread, of which the following is a specification.

My invention relates to a process of manufacturing an albuminous food from fish, potatoes, flour, ferment and a suitable liquid.

In carrying out my invention I knead up cooked fish (as, for instance, cod or haddock) with boiled potatoes. Hereupon I make a dough by adding some kind of flour, such as that of maize, oats, barley, rice, millet, buckwheat, chestnuts, peas, beans, or other grain, pulse or the like, together with a ferment, as, for example, leaven or yeast. In working up the dough, water, milk or other liquid may be employed, and spice or the like may be added if desired. The dough thus obtained is allowed to rise and is then baked in the ordinary manner in a baking oven. The action of the various ingredients upon each other is such that the new product so obtained possesses neither a fishy nor mealy, potato flavor or odor.

A particular feature of the invention is that it admits of the use of various flours other than those commonly used by bakers, viz. rye and wheat. It is well known that bread made with the flour or meal of the pulses, or of other grains than the two just mentioned, possesses a pronounced and peculiar flavor which renders it wholly unsuitable for general consumption by persons accustomed only to rye or wheat bread. The new product, on the other hand, even when made of other flour than that of rye or wheat, is nevertheless hardly to be distinguished in taste from ordinary rye bread.

Instead of only one kind of flour being used, a mixture of such may naturally be employed if desired.

The dough may be baked to form bread, zwieback, pie-crust or the like, and may be put on the market in any suitable shape.

The product may be pulverized, if desired and can then be conveniently added to soups etc.

A good proportion of the various ingredients has been found to be:—1 part of fish, 1 part of potato, 1 part of flour, and the necessary quantity of ferment, liquid, spices, or the like, but it is obvious that there may be wide variation in the proportions of the various ingredients according to requirement in special cases.

What I claim is:—

The herein described process of making albuminous bread which consists in mixing together and kneading boiled potatoes and cooked fish; then adding to such mixture flour of maize, oats, barley, rice, millet, buckwheat, chestnut flour, or the flour of edible leguminous plants such as beans, peas, etc., a liquid, and a ferment, all substantially in the proportions named, thus forming a dough; then properly working the dough; then permitting the dough to rise; and finally baking the dough in an oven, substantially as described.

In testimony whereof I affix my signature in presence of two witnesses.

GUSTAV HESS.

Witnesses:
PAUL E. SCHILLING,
PAUL ARRAS.